United States Patent [19]
Akhtar et al.

[11] Patent Number: 5,328,942
[45] Date of Patent: Jul. 12, 1994

[54] SEED FILM COMPOSITIONS

[75] Inventors: Ikbal A. Akhtar, Watertown; Harold R. Sisken, Cheshire, both of Conn.

[73] Assignee: Uniroyal Chemical Company, Inc., Middlebury, Conn.

[21] Appl. No.: 918,724

[22] Filed: Jul. 21, 1992

Related U.S. Application Data

[63] Continuation-in-part of Ser. No. 732,844, Jul. 19, 1991, abandoned.

[51] Int. Cl.$^5$ .................. C08L 1/00; C08L 1/26; A61K 9/16; A01C 1/06
[52] U.S. Cl. ..................... 524/35; 524/43; 524/44; 524/377; 424/494; 424/495; 47/57.6
[58] Field of Search .............. 524/43, 44, 378, 379, 524/37, 38, 41, 39, 35, 377; 424/494, 495, 438; 47/57.6, 57.610, 57.613, 57.615

[56] References Cited

U.S. PATENT DOCUMENTS

| | | | |
|---|---|---|---|
| 4,283,229 | 8/1981 | Girg et al. | 106/171 |
| 4,615,141 | 7/1986 | Janick et al. | 47/57.6 |
| 5,089,271 | 2/1992 | Unangst | 424/495 |

FOREIGN PATENT DOCUMENTS

| | | | |
|---|---|---|---|
| 598380 | 12/1989 | Australia | |
| 0133827 | 6/1985 | European Pat. Off. | |
| 0180287 | 5/1986 | European Pat. Off. | 524/44 |

OTHER PUBLICATIONS

Journal of Pharmacy and Pharmacology, "Stress Crack Resistance of Some Pigmented Tablet Film Coating Systems", vol. 37, Jul. 1985 pp. 449–454.

WPI/Derwent AB J54064630; Tablet Coating Composition Prolong Disintegrate Time Contain Water Soluble Polymer.

CA 115(2):154763v Comparison of film forming materials for coating of tablets with a pseudo fluid layer.

*Primary Examiner*—Paul R. Michl
*Assistant Examiner*—LaVonda DeWitt
*Attorney, Agent, or Firm*—Jerome D. Drabiak

[57] ABSTRACT

Film-forming compositions for coating objects, such as seeds, are characterized by a cellulosic polymer, and a polyalkylene oxide polymer. The compositions may also include a glycol, microbial agents, gelling agents, surfactants, and antifoamants in an aqueous medium.

In a process for enveloping solid forms such as seeds with the above composition, the composition may be mixed with seed protectant chemicals, such as fungicides, prior to its application to seeds in seed treating equipment.

10 Claims, No Drawings

SEED FILM COMPOSITIONS

CROSS REFERENCE TO RELATED APPLICATION

This is a continuation-in-part of application Ser. No. 07/732,844 filed Jul. 19, 1991, now abandoned.

BACKGROUND OF THE INVENTION

1. Field Of the Invention

This invention is directed to film-forming compositions for enveloping solid forms, particularly seeds. In another aspect, the invention relates to a process for enveloping with the aid of these compositions. In a further aspect, the invention is concerned with the seeds coated with the compositions of this invention.

Seeds are treated to promote good seedling establishment, to minimize yield loss, to maintain and improve the quality of the seeds and to avoid the spread of harmful organisms.

Other benefits derived from seed treatments include improved adhesion of any pesticidal formulation, the ability to maintain the distribution of said pesticides during the application of the treatment, improving the flow of seeds during treatment, enhancement of the appearance and perceived quality of the seeds, and greatly reducing the potential hazards from dust during treating and handling. Biological considerations for seed coatings include that the pesticides should: be consistently effective under various environmental conditions; be safe to operators during handling and sowing; be safe to wildlife; have a wide safety margin between the dose that controls harmful organisms and the dose that harms the plant; be compatible with other materials used on the seed; and not produce harmful residues in the plant or soil.

Protection of seeds and young seedlings from soilborne pests during the early stages of plant growth is the main purpose of seed treatment. The use of fungicides and insecticides for protecting seeds and seedlings against seed and soil-borne diseases is well known and widely used. There is also the desire to develop systems containing biologically active materials and to exploit the potential of the seed as a carrier for highly targeted materials such as microorganisms, trace elements, growth regulators, and the like.

Successful and practical seed treatments should satisfy a range of commercial requirements. For example, the treatment should provide effective delivery of any active ingredient contained therein. As another example, the physico-chemical characteristics of the formulation should facilitate application to and retention on the seeds.

Additionally, a coloring agent, such as a dye is required by law in the seed coating so that an observer can immediately determine that the seeds are treated. The dye is also useful to indicate to the user the degree of uniformity of the coating applied.

It is therefore an object of this invention to provide a film-forming composition for seed coating. It is a further object of their invention to provide a seed coating composition with properties greater than any of the individual components of the composition.

It is a further object of this invention to provide a method for effectively coating seeds with this film forming composition. It is still a further object of this invention to provide final seed products obtained and coated with these compositions.

2. Description of Related Art

U.S. Pat. Nos. 4,513,019 and 4,576,646 describe a process for enveloping objects such as seeds with a composition comprising a cellulosic film-forming substance, at least one alpha-cellulose, and a suitable plasticizer.

U.S. Pat. No. 4,543,370 describes a seed coating composition which includes cellulosic film-forming polymer, a pigment, a plasticizer, and optionally, a colloidal silica and a surfactant.

British Patent No. 2,040,684A describes a method and a composition for treating seeds including an active pesticide and adhesive sticker in admixture with suspending agents, surface active agents, and other adjuvants, applied to seeds to yield seeds with an adherent coating in which active pesticidal agent is dispersed.

SUMMARY OF THE INVENTION

It has been found that when certain water soluble, film-forming polymers are combined in definite proportions, the resulting polymer mixture possesses improved properties when used for seed coating applications. The seed coating composition has film properties that are superior to those of the individual components of the composition.

The film-forming compositions for coating objects such as seeds according to the current invention comprise a cellulosic polymer and a plasticizer. The plasticizer is selected from the group consisting of polyalkylene oxide polymers having a viscosity average molecular weight of at least about 150,000 and polyalkylene alcohols. Particularly, the film-forming compositions of the present invention comprise from 33 to 85 percent as dry weight of a cellulosic polymer and from 16 to 66 percent as dry weight of a plasticizer. The present compositions are substantially free from alpha-cellulose.

The compositions of this invention may also include a glycol, microbial agents, gelling agents, surfactants, or antifoamants in an aqueous medium.

A process for enveloping solid forms such as seeds with the above composition is also embraced by the present invention. It is intended that the composition will be mixed with seed protectant chemicals, such as fungicides, prior to its application to seeds in seed treating equipment. The final product, consisting of coated seeds, is also embraced by the current invention.

DETAILED DESCRIPTION OF THE INVENTION

The film-forming compositions of the present invention contain: a) from 33 to 85 percent as dry weight of a cellulosic polymer; and b) from 15 to 66 percent as dry weight of a plasticizer, preferably a polyalkylene oxide polymer or polyalkylene alcohol. The preferred weight ratio of cellulosic polymer to polyalkylene oxide polymer is between 1:2 and 6:1. A more preferred ratio is between 4:1 and 5:1.

To this formulation may be added a glycol, preferably selected from the group of dialkylene glycols including, for example, diethylene glycol, dipropylene glycol and the like. Other compounds which may be present include gelling agents such as hydrous magnesium aluminum silicates, surfactants such as ethoxylated alkyl phenol, and antifoam agents such as silicone dispersions. Normally these additional, optional components are each present in an amount up to ten percent based on the total composition. Additionally, an effective amount of one or more active ingredients, for example, microbial agents such as benzisothiazolinone, fungicides or other chemical protectants, may be included in the seed-coating composition. The amount of active ingredient employed may vary widely depending on the nature of the active ingredient. When used, the active ingredient may be present in an amount ranging from trace amounts, i.e., less than 0.5 percent, up to fifty percent based on the total composition.

The composition can be dissolved or dispersed in water, and if needed, surfactants, clays, mica, and dyes may be added to obtain a desired appearance.

Cellulosic polymers suitable for use in the present film-forming compositions are the hydroxyalkyl ethers of cellulose, preferably, hydroxyalkyl methylcellulose, i.e., hydroxymethyl methylcellulose, hydroxyethyl methylcellulose, and hydroxypropyl methylcellulose. Other suitable cellulosic polymers include the monocarboxylic esters of cellulose, i.e., cellulose acetate; and the mixed ether-esters of cellulose. A preferred selection from this group is hydroxypropyl methylcellulose. Preferably, the cellulosic polymer is substantially free from alpha-cellulose and sodium carboxymethyl cellulose.

A plasticizer will be used with the cellulosic film-forming substance. The main function of the plasticizer is as a cooperative film-forming agent, binder, and plasticizer, to modify the suppleness and strength of the films made with the cellulosic substances.

Among the plasticizers that may be used in the present film-forming compositions are polyalkylene oxide polymers having a viscosity average molecular weight of at least about 150,000. In preferred embodiments, the viscosity average molecular weight of the polyalkylene oxide polymer ranges from about 150,000 to about 6,000,000. More preferably, the viscosity average molecular weight ranges from about 200,000 to about 1,000,000, most preferably, from about 200,000 to about 300,000. Suitable non-limiting examples of polyalkylene oxide polymers are polyethylene oxide polymers and polypropylene oxide polymers. Preferably, the polyalkylene oxide polymer is a polyethylene oxide polymer. A suitable source of polyethylene oxide polymer is POLYOX TM brand polyethylene oxide polymer available from Union Carbide Corporation.

The preferred polyethylene oxide polymer of this invention, also known as a poly(ethylene oxide) resin, may be represented by the formula:

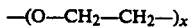

wherein x may be a variety of numbers such that the viscosity average molecular weight of the polymer is at least about 150,000. Because of the high molecular weight of these kinds of resins, the concentration of reactive end groups is extremely small, and therefore, typically essentially no end-group reactivity is observed.

The polyalkylene oxide polymers of this invention are to be distinguished from polyalkylene glycols, such as polyethylene glycol (PEG). The glycols are characterized as having a number average molecular weight ranging from as low as 200 to about 20,000. Polyalkylene glycols contain hydroxyl end-groups, the concentration of which is large enough such that end-group reactivity of these compounds is typically observed.

Alternatively, a polyalkylene alcohol may be employed as a plasticizer in the composition and process of this invention in place of the polyalkylene oxide polymer. Suitable nonlimiting examples of polyalkylene alcohols include polyvinyl alcohol, polypropylene alcohol and the like. Preferably, the polyalkylene alcohol is polyvinyl alcohol. Typically, the viscosity average molecular weight of the polyalkylene alcohol is at least about 100,000. Preferably, the viscosity average molecular weight ranges from about 100,000 to about 300,000, more preferably, to about 220,000. In further preferred embodiments, from about 80 to about 99 percent of the polyalkylene alcohol is alcoholized.

If the addition of secondary binders is desired at the discretion of the formulator, the following are some possibilities: polyvinyl pyrrolidone, sodium carboxymethyl cellulose, or any of a number of latexes commercially available for this purpose.

The compositions according to the invention may further comprise the additives conventionally used for modifying the properties of the coating material, such as color, speed of dissolution in various media, and for protecting the material from damage from the environment, such as anti-oxidants and ultra-violet light protectors. Glycol substances, such as dipropylene glycol, may be added for anti-freeze protection in colder climates. Materials that may be added to obtain a desired appearance include clays, mica and dyes.

The viscosity of the present seed-coating compositions at application should be between about 300 and 2000 centipoise, with a preferred performance viscosity of about 900 centipoise. The effective amount of seed coating composition per 100 pounds of seeds may range between 4 and 8 ounces.

Among the seeds that can be coated successfully with the present compositions are soybean, sunflower, corn, peas, and rape seed, but the application of the compositions is not limited to these seeds.

A principal feature of this film-forming composition is that it provides a seed coating with increased elasticity. Reduced brittleness results in decreased dustiness and the subsequent elimination of related dust problems. Elimination of the dust associated with many seed treatments also eliminates the associated health hazards to those who work with treated seeds, such as processing plant employees, truck drivers, warehouse workers, and farmers.

Another advantageous feature provided by the coating is a reduction in seed splitting or cracking, resulting in increased germination of the treated seeds. The film forming composition of this invention also allows for filling in of the natural cracks in older seeds, which leads to an increase in germination.

Still another advantage of this invention is the uniform coating of seeds with non-dusting seed treatment which will not interfere with germination and sprouting of the seed but which will protect the seed against seed-borne pathogens.

A further advantage afforded by this invention is a method of treating seeds which will materially reduce the quantity of treatment applied to the seed, and thereby reducing the cost of seed treatment.

The preferred process for making a coating using film-forming compositions according to the present invention consists of dissolving or dispersing the various ingredients of the mixture in a suitable solvent, such as an aqueous medium, then in spraying the solution or suspension obtained onto the previously prepared substrates. The aqueous solutions or dispersions may attain concentrations of up to 25% by weight of the film-forming composition of this invention, the remainder of the solution being solvent. The films so obtained are quite adherent to the substrates. Consequently, they provide excellent resistance to abrasion or to peeling at the edges. The hardness of the cores of the substrates is also increased and therefore made more durable and resistant to damage.

The choice of the particular film-forming composition used and the additives chosen will depend on the application and use of the seed substrate. For example, an effective protection against dampness may be obtained while maintaining or improving the germinative properties of the seeds when a coating designed for low temperature is used.

The following examples are illustrative of the composition and process of this invention, but should not be construed to be limiting thereof. In all of the examples which follow, POLYOX WR PA 3154 brand polyethylene oxide polymer is employed. That polymer resin is characterized by a viscosity average molecular weight ranging between 200,000 and 300,000.

EXAMPLE 1

775 g of hydroxypropyl methycellulose (HMPC) (Methocel E6, trademark of the Dow Corporation) and 155 g of polyethylene oxide polymer (Polyox WR PA 3154, trademark Union Carbide Corporation) were added to 7,750 g of water under agitation until a complete dissolution was obtained. This was completed in about four hours. To this solution was added 100 g of dipropylene glycol, 25 g of clay and 25 parts of a surfactant. The resulting semi-transparent liquid had a viscosity of 900 cps.

A thin film of this material was drawn on a glass slide which, after drying, gave an elastic, non-brittle, translucent film which did not cling to the glass and was easily peeled off. By contrast, either of the polymers alone, when prepared in the same way, gave films which were more brittle and were not readily peeled from the glass.

Four ounces of this material was mixed with 4 ounces of a fungicide, Vitavax ® (trademark, Uniroyal Chemical Company) and one-half ounce of a colorant, Pro-ized ® pigment (trademark, Gustafson, Inc.) dispersion and applied to 100 lbs of soybean seeds. For this purpose a commercial 6-foot film treater was used.

The coated seeds were compared for dust-off and showed no dust when compared to seeds coated with fungicide alone. The coated seeds were smooth, shiny, and red.

The measurement for dustiness used and several comparative examples follow. The method entails agitating 40 grams of seeds by air jet and the dust collected on filter paper and is weighed on an analytical balance. The dust test demonstrates a comparison of how a seed treatment chemical adheres to the seed. The lower dust level indicates a more effective seed coating.

Table I indicates the amount of dust generated by each seed treatment or lack thereof.

TABLE I

| Type of Seed Treatment | Dust Weight (mg) |
| --- | --- |
| Untreated | 1.5 |
| Vitavax ® 200 FF Red[1] | 0.4 |
| Composition of Example #1 | 0.0 |
| Vitavax ® + Seperit 2039[2] | 0.8 |
| Vitavax + Methocel E6 | 1.1 |

TABLE I-continued

| Type of Seed Treatment | Dust Weight (mg) |
| --- | --- |
| Vitavax + Polyox WPRA | 1.0 |

Notes for Table I:
[1] Vitavax 200 FF red is a commercially available coating formulation from Uniroyal Chemical Company.
[2] Seperit is a trademark of the Seppic Corporation.
[3] Methocel E6 was applied 6% by weight and was prepared as described above for Example 1.
[4] Polyox WRPA was applied 5% by weight and was prepared as in Example 1.

It is apparent from the above dustiness data that the composition of Example 1 is much better than either the untreated seeds of the commercially available coated seeds. For comparative purposes, the seeds were coated with each of the film-forming polymers which together comprise the coating of Example 1. The data shows that each of these materials taken separately result in poor performance regarding dustiness. Their combination results in the surprising efficacy of the composition of Example 1.

EXAMPLE 2

Twelve grams of hydroxypropyl methylcellulose (HPMC) (Methocel E-6) and 12 g of polyethylene oxide polymer (Polyox WR PA 3154) were added to 300 g of water at 50/C. The mixture agitated for 1 hour in a glass beaker to obtain a hazy solution was mixed with Vitavax 200 FF red in the ratio of 1:1 to obtain a slurry of about 700 cps viscosity. Eight ounces of the above composition was applied to 100 pounds of soybean seeds. These seeds were similar to those of Example 1 both in quality and appearance.

EXAMPLE 3

Fifty grams of hydroxypropyl methylcellulose (HPMC) and 20 g of polyethylene oxide polymer (Polyox WR PA 3154) were mixed in a Waring blender for 5 minutes to obtain a homogeneous mixture. The mixture was then dispersed in 800 grams of water. To this was added 50 parts of dipropylene glycol, 50 grams of surfactant (Armul 1310, trademark, DeSoto Company), 50 grams of Min-u-gel PC (trademark, Floridan Company), and a colorant (Pro-ized colorant, trademark, Gustafson, Inc.) which was predispersed in 100 grams of water. This gave a translucent polymer dispersion which was applied to sunflower seeds at the rate of 8 ounces per 100 lbs of seeds. The treatment resulted in very smooth and shiny coatings on the sunflower seeds.

EXAMPLE 4

Thirty five grams of hydroxypropyl methylcellulose (HPMC) (Methocel E6) and 60 g of polyethylene oxide polymer (Polyox WR PA 3154) were dispersed in 900 grams of water under agitation to obtain a solution. This solution was mixed in a 1:1 ratio with a fungicide (Captan, trademark of Gustafson, Inc.) and applied to corn seeds at the rate of 8 ounces per 100 lbs of seeds in a glass jar that was manually shaken. The resulting seeds were evenly covered with the coating composition. When Captan alone was applied to the seeds, the depressed part of the seed remained uncoated and the seeds were not uniform in appearance or coverage.

EXAMPLE 5

Pilot Plant Production

Into a 150 gallon mixing vessel is pumped 733.48 lbs. of water and 0.27 lbs. of an antifoam agent (Antifoam FG-10, trademark Dow Corning Company). Heat is then applied with slow agitation to raise the water temperature to about 60/C. When this temperature is attained the speed of the propeller is increased.

The heat pump is then turned off and 71.25 lbs. of hydroxypropyl methylcellulose (Methocel E-6, trademark of the Dow Company) is added over a time period of ¼ to ¾ hours in manageable portions. Care must be taken not to add this too quickly because excessive frothing will result.

14.65 lbs. of polyethylene oxide polymer (Polyox WR PA 3154, trademark of the Union Carbide Company) is added with good agitation for 15 minutes and allowed to disperse well. A thorough dispersion will require one or two hours. 96.92 lbs. of dipropylene glycol, 1.00 lb. of microbial agent (Proxel GXL, trademark of ICI Americas, Inc.), 4.40 lbs. of gelling agent (Min-U-Gel, trademark of the Floriden Co.), and 20.81 lbs. of surfactant (Armul 1310, trademark of DeSoto, Inc.) are added, and agitation continued for one or two hours more.

What is claimed is:

1. A composition comprising:
   a cellulosic polymer;
   a polyalkylene oxide polymer plasticizer having a viscosity average molecular weight of at least about 150,000; and
   a glycol.

2. A composition as in claim 1 wherein said cellulosic polymer is selected from the group consisting of the monocarboxylic esters of cellulose, the hydroxyalkyl ethers of cellulose, and the mixed ether-esters of cellulose.

3. A composition as in claim 1 wherein said glycol is a dialkylene glycol.

4. A composition as in claim 1 wherein said plasticizer is a polyethylene oxide polymer.

5. A composition comprising:
   a cellulosic polymer; and
   a polyalkylene oxide polymer plasticizer having a viscosity average molecular weight of at least about 150,000.

wherein the weight ratio of cellulosic polymer to plasticizer is between 1:2 and 6:1.

6. A composition as in claim 5 wherein the weight ratio of cellulosic polymer to plasticizer is between 4:1 and 5:1.

7. A composition comprising:
   a cellulosic polymer;
   a polyalkylene oxide polymer plasticizer having a viscosity average molecular weight of at least about 150,000;
   a gelling agent;
   a surfactant;
   an antifoam agent; and
   an active ingredient.

8. A process for enveloping solid forms, comprising:
   dispersing a cellulosic polymer and a polyalkylene oxide polymer plasticizer having a viscosity average molecular weight of at least about 150,000 in an aqueous medium to produce a dispersion;
   incorporating a glycol into said dispersion, wherein said glycol is either diethylene glycol or dipropylene glycol; and
   applying the dispersion to a solid form to be enveloped.

9. A process for enveloping solid forms, comprising
   dispersing a cellulosic polymer and a polyalkylene oxide polymer plasticizer having a viscosity average molecular weight of at least about 150,000 in an aqueous medium to produce a dispersion;
   applying the dispersion to a solid form to be enveloped; and
   incorporating into said dispersion: a gelling agent; a surfactant; an antifoam agent; and an active ingredient, before said dispersion is applied to the solid form.

10. A process for enveloping solid forms, comprising
    dispersing a cellulosic polymer and a polyalkylene oxide polymer plasticizer having a viscosity average molecular weight of at least about 150,000 in an aqueous medium to produce a dispersion; and
    applying the dispersion to a solid form to be enveloped,
    wherein the dispersion is applied to the solid form by spraying.

* * * * *